United States Patent [19]

Koziol

[11] Patent Number: 4,773,384
[45] Date of Patent: Sep. 27, 1988

[54] ADJUSTABLE GAS INTAKE ASSEMBLY

[75] Inventor: Walter Koziol, Antioch, Ill.

[73] Assignee: Modern Home Products Corp., Antioch, Ill.

[21] Appl. No.: 83,934

[22] Filed: Aug. 5, 1987

Related U.S. Application Data

[63] Continuation of Ser. No. 768,853, Aug. 23, 1985, abandoned, which is a continuation-in-part of Ser. No. 617,949, Jun. 6, 1984, abandoned, which is a continuation-in-part of Ser. No. 548,723, Nov. 4, 1983, Pat. No. 4,478,205, and Ser. No. 548,724, Nov. 4, 1983, Pat. No. 4,488,534.

[51] Int. Cl.$^4$ .................. A47J 37/00; F24B 3/00; F16L 9/00
[52] U.S. Cl. ................. 126/41 R; 126/39 R; 126/52; 138/103; 138/118; 138/109
[58] Field of Search ................. 266/48; 285/226, 229, 285/903, 235, 236; 126/25 R, 25 A, 25 AA, 30, 39 C, 39 H, 91 R, 93, 52; 431/354, 355, 278; 138/118, 122, 129, 154, 192

[56] References Cited

U.S. PATENT DOCUMENTS

| | | | |
|---|---|---|---|
| 370,067 | 9/1887 | Knapp . | |
| 741,991 | 10/1903 | Adams . | |
| 905,009 | 11/1908 | Shores . | |
| 1,325,116 | 12/1919 | Sebille . | |
| 1,827,505 | 10/1931 | Bluhm . | |
| 2,094,854 | 10/1937 | Smith | 42/55 |
| 2,203,210 | 6/1940 | Young | 239/24.5 R |
| 2,218,961 | 10/1940 | Schulz | 126/39 E |
| 2,253,377 | 8/1941 | Jones et al. | 266/48 |
| 2,257,010 | 9/1941 | Hildebrand | 101/416 |
| 2,339,477 | 1/1944 | Hess et al. | 158/7 |
| 2,470,989 | 5/1949 | Keller et al. | 285/226 |
| 2,776,706 | 1/1957 | Drake | 431/355 |
| 3,090,372 | 5/1963 | Evans | 126/25 |
| 3,148,723 | 9/1964 | Farquhar | 158/27.4 |
| 3,289,801 | 12/1966 | Jerkins | 194/3 |
| 3,322,112 | 5/1967 | Huff et al. | 126/41 |
| 3,332,339 | 7/1967 | Helgeson et al. | 99/339 |
| 3,496,926 | 2/1970 | Kemp et al. | 126/39 |
| 3,626,923 | 12/1971 | Martin | 126/41 R |
| 3,638,635 | 2/1972 | Drennan | 126/41 R |
| 3,779,312 | 12/1973 | Withers, Jr. et al. . | |
| 3,878,829 | 4/1975 | Schantz | 126/41 R |
| 3,938,494 | 2/1976 | Clark | 126/41 R |
| 4,020,821 | 5/1977 | Reid, Jr. et al. | 126/39 E |
| 4,081,190 | 3/1978 | Itzler | 138/121 |
| 4,088,436 | 5/1978 | Alferes | 431/21 |
| 4,092,975 | 6/1978 | Grammatopoulos | 126/41 R |
| 4,149,516 | 4/1979 | Hall | 126/41 R |
| 4,165,110 | 8/1979 | Itzler | 285/226 |
| 4,267,816 | 5/1981 | Koziol | 126/41 R |
| 4,356,810 | 11/1982 | Ferlin | 126/41 R |
| 4,373,505 | 2/1983 | Koziol | 126/39 E |
| 4,381,758 | 5/1983 | Suekis et al. | 126/41 R |
| 4,462,384 | 7/1984 | Hitch | 126/41 R |
| 4,478,205 | 10/1984 | Koziol | 126/41 R |
| 4,586,483 | 5/1986 | Perez | 126/41 R |
| 4,598,692 | 7/1986 | Hitch | 126/41 R |
| 4,624,240 | 11/1986 | Hitch | 126/41 R |

FOREIGN PATENT DOCUMENTS

| | | | |
|---|---|---|---|
| 811597 | 2/1951 | France . | |
| 2524492 | 12/1976 | Fed. Rep. of Germany | 126/39 R |
| 0065837 | 5/1980 | Japan | 126/39 R |
| 0231329 | 12/1984 | Japan | 126/39 E |
| 1427342 | 3/1976 | United Kingdom . | |

Primary Examiner—Larry Jones
Attorney, Agent, or Firm—Quarles & Brady

[57] ABSTRACT

An adjustable gas intake assembly for a barbecue grill which can be utilized with various types of gas barbecue grill burners. A venturi tube and a supply tube are connected by a flexible section which will provide horizontal or vertical adjustment of the supply tube. In one embodiment the supply tube has a flexible section which will afford axial compression and expansion for vertical adjustment of the supply tube. In another embodiment the supply tube has a flexible section and a telescoping section is provided in the venturi portion or the supply tube portion. This telescoping section is represented by at least one separate tubular member communicating with the flexible section.

15 Claims, 3 Drawing Sheets

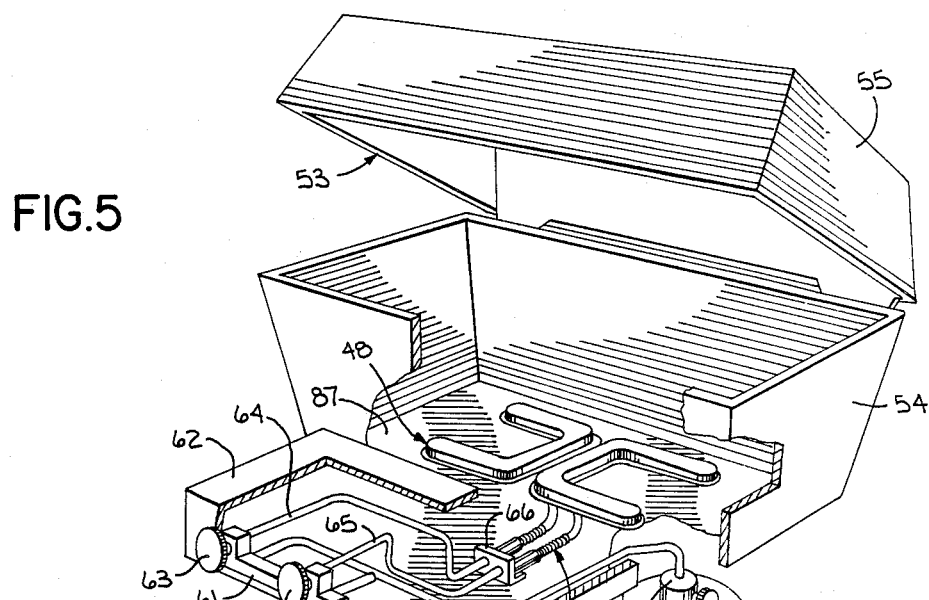
FIG. 5
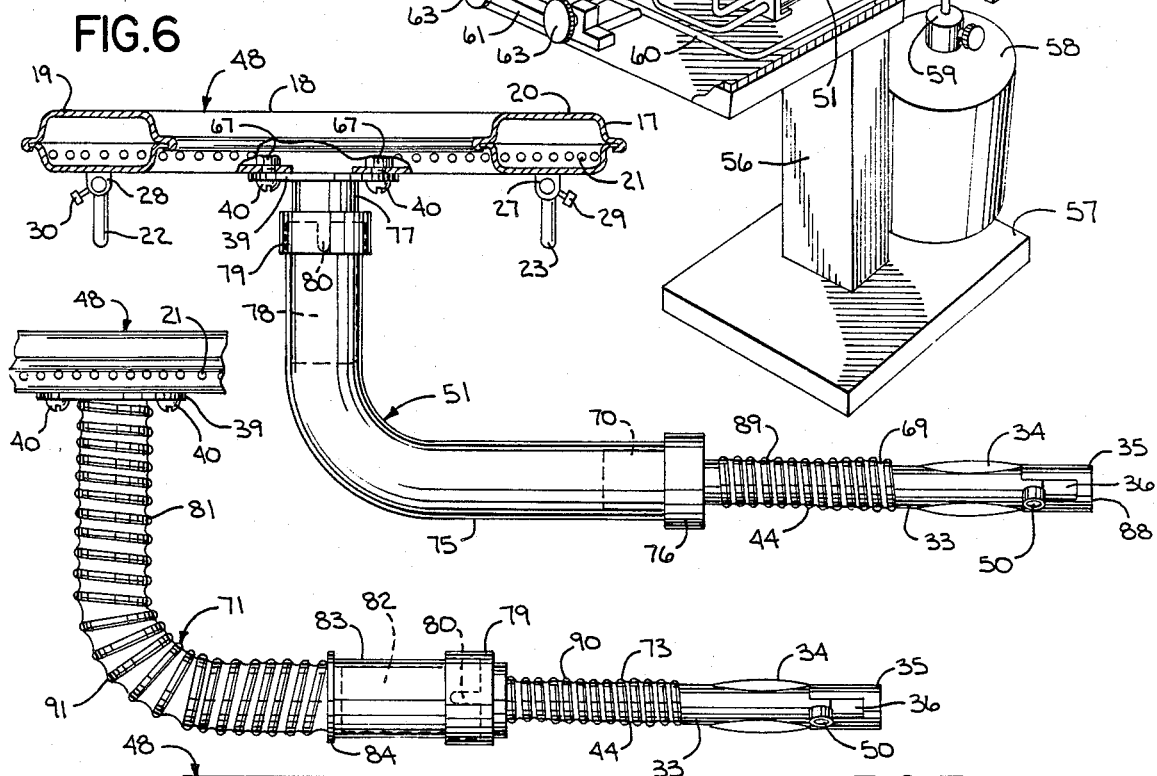
FIG. 6
FIG. 7
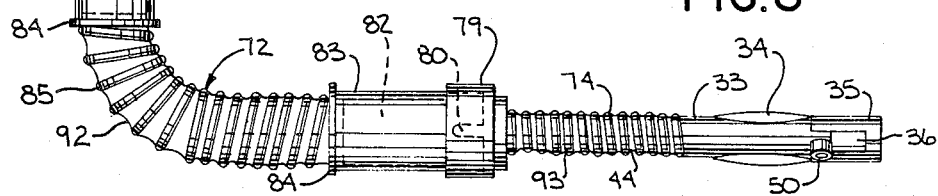
FIG. 8

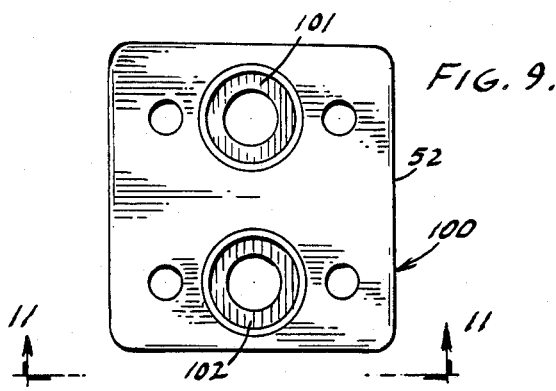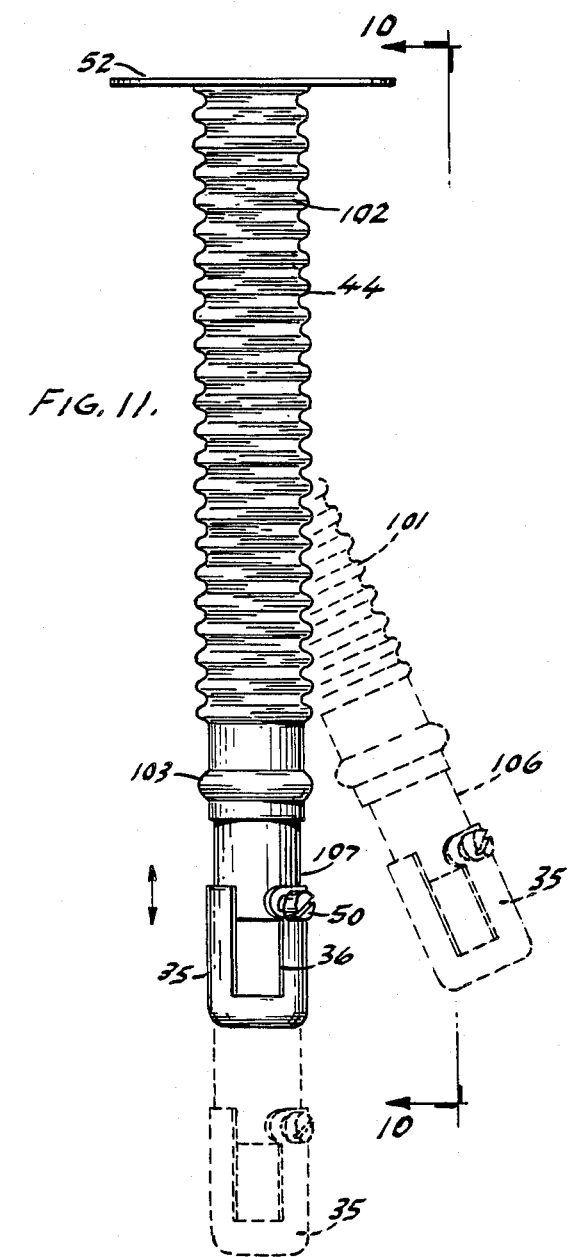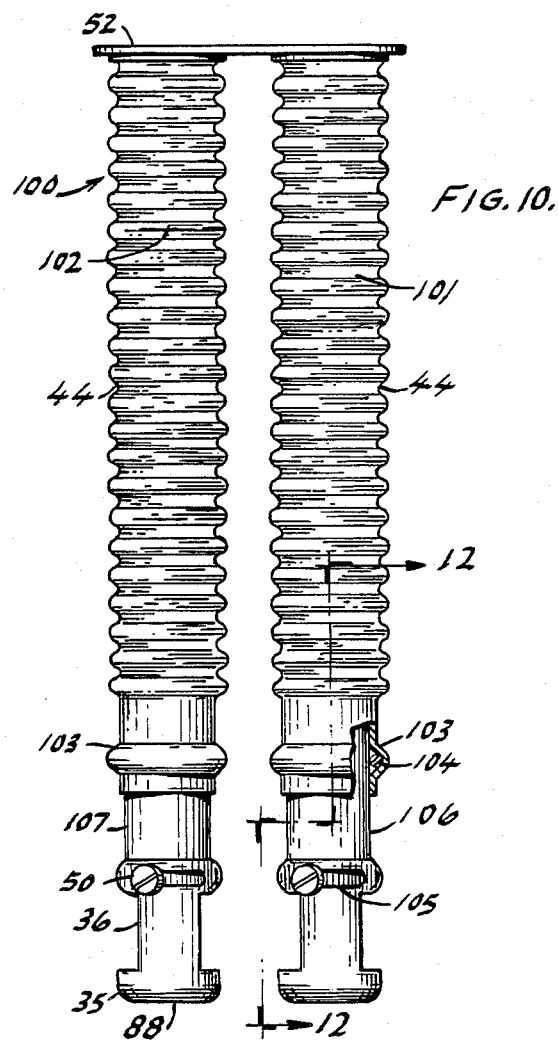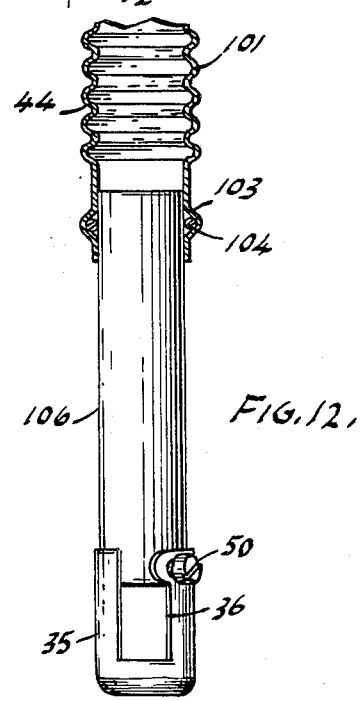

ADJUSTABLE GAS INTAKE ASSEMBLY

CROSS-REFERENCE TO RELATED APPLICATIONS

This application is a continuation of application Ser. No. 768,853, filed Aug. 23, 1985, abandoned which is a continuation-in-part of application Ser. No. 617,949 filed June 6, 1984, abandoned which is a continuation-in-part of applications Ser. Nos. 548,723 and 548,724, both filed Nov. 4, 1983, now U.S. Pat. Nos. 4,478,205 and 4,488,534, respectively.

BACKGROUND OF THE INVENTION

This invention relates to a gas venturi tube for a burner element in a barbecue gas grill. More particularly, it relates to a flexible, adjustable gas intake assembly for a gas burner element so that proper connection can be made between the burner element and a gas supply nozzle irrespective of the vertical, horizontal or vertical and horizontal distance the burner element is supported from the floor in relation to the gas supply.

Various barbecue grill bases have floors for the burner element located at various positions on the floor and located vertically or horizontally from the gas supply nozzle. Accordingly, it is necessary to construct each gas intake pipe and venturi tube to match the particular distance from the burner element and the gas supply nozzle so that the burner element is in communication with the gas supply pipe. Cost savings could be effected if a venturi tube is fabricated so as to fit in a suitable manner many burner elements in a barbecue base portion and provide proper connection with a gas supply.

The state of the art for gas delivery systems for barbecue grills is illustrated in U.S. Pat. Nos. 3,638,635 and 4,373,505. In U.S. Pat. No. 3,638,635 a one-piece, non-adjustable venturi tube 63 extends from gas valve 70 to burner 25 and is attached thereto by base 65 and screws 63. In U.S. Pat. No. 4,373,505 which is commonly assigned, adjustable securing means such as represented by screw 51 and dimples 50 are provided on the venturi tube 24 and a gas intake tube 55. In German Pat. No. 25 24 492 there is described a gas cooking unit wherein a gas connection can be made with flexible coiled tubing or telescoping tubes. The particular unit is of the range and oven type.

It is an advantage of the present invention to provide a venturi tube for a burner in a gas barbecue grill which can operatively provide connection between numerous gas burner elements in grill base floors and a gas intake nozzle which is spaced horizontally or vertically from the burner. It is another advantage of this invention to provide a dual adjustment means including a flexible section between a gas venturi tube and a burner element which can afford positioning of the burner element at various elevations from the floor as well as being spaced horizontally from the gas supply pipe. It is still another advantage of this invention to provide a secure adjustable gas intake assembly between a burner element and a gas supply pipe wherein an easily compressible and expandable vertically positioned flexible section is utilized in a gas barbecue grill which will provide quick adjustment without leakage. It is yet another advantage of the present invention to provide a dual adjustable gas intake assembly for a gas grill burner element which can be manufactured and assembled in an economical manner. It is still another advantage of this invention to provide horizontal and vertical adjustment between the venturi tube and a gas intake pipe as well as rotatable adjustment between the connecting flange of the venturi assembly and the burner element.

SUMMARY OF THE INVENTION

The foregoing advantages are accomplished by the present adjustable gas intake tube assembly for a gas burner element wherein the burner element has the usual hollow, apertured body member having a portion for receiving a gas intake member. In one embodiment, the dual adjustment of the gas intake tube assembly is effected by means of a first tubular or venturi member having at least one aperture which is preferably lateral. An air regulator member is operatively associated with the venturi member and a gas supply means. It is received by the venturi member at one end thereof to preferably slidably and controllably cover the lateral aperture. An opening is provided by the tubular member at one end for receiving a gas supply means. A second tubular member serves as a gas supply tube and one of the first or second members has a flexible section. In some of the embodiments, a telescoping relationship is provided between the first and second tubular members and the tubular members are represented by at least one separate tubular member telescoping with the flexible section. The flexible section can provide a right-angled flexible section or can be employed in a linear vertical manner with some offset. The flexible section provides both horizontal and vertical adjustment of the second tubular member with the burner element. In other embodiments, a third tubular member telescopes with respect to the second tubular member. Connecting means are provided in conjunction with the second tubular member at the end opposite the first tubular member or with the third tubular member for connection with a gas burner element. In another embodiment, the second tubular member is represented by a tubular portion and has an axially expandable or compressible flexible section which will afford vertical adjustment with limited horizontal movement. This flexible section is preferably formed from stainless steel and will be subjected to an annealing process. The annealed stainless steel will have a wall thickness in the range of 0.006 to 0.008 inch.

BRIEF DESCRIPTION OF THE DRAWINGS

A better understanding of the present adjustable gas intake assembly for a burner element will be accomplished by reference to the drawings wherein:

FIG. 5 is a perspective view of a gas barbecue grill unit with portions broken away to illustrate a dual adjustable gas intake or venturi tube assembly and a burner element of this invention.

FIG. 6 is a view in side elevation of one of the adjustable gas intake or venturi tubes shown in the barbecue grill unit of FIG. 5.

FIG. 7 is a view similar to FIG. 6 illustrating an alternative embodiment.

FIG. 8 is a view similar to FIG. 6 showing yet another alternative embodiment.

FIG. 9 is a top plan view showing still another alternative embodiment of a mounting flange for attachment of the adjustable venturi tube assembly shown in FIGS. 10 and 11.

FIG. 10 is a view in side elevation taken along line 10—10 of FIG. 11.

FIG. 11 is a view in front elevation taken along line 11—11 of FIG. 9.

FIG. 12 is a view in partial vertical section and partial side elevation taken along line 12—12 of FIG. 10 but with the lower tubular member extended.

DESCRIPTION OF THE PREFERRED EMBODIMENT

Figure 1:
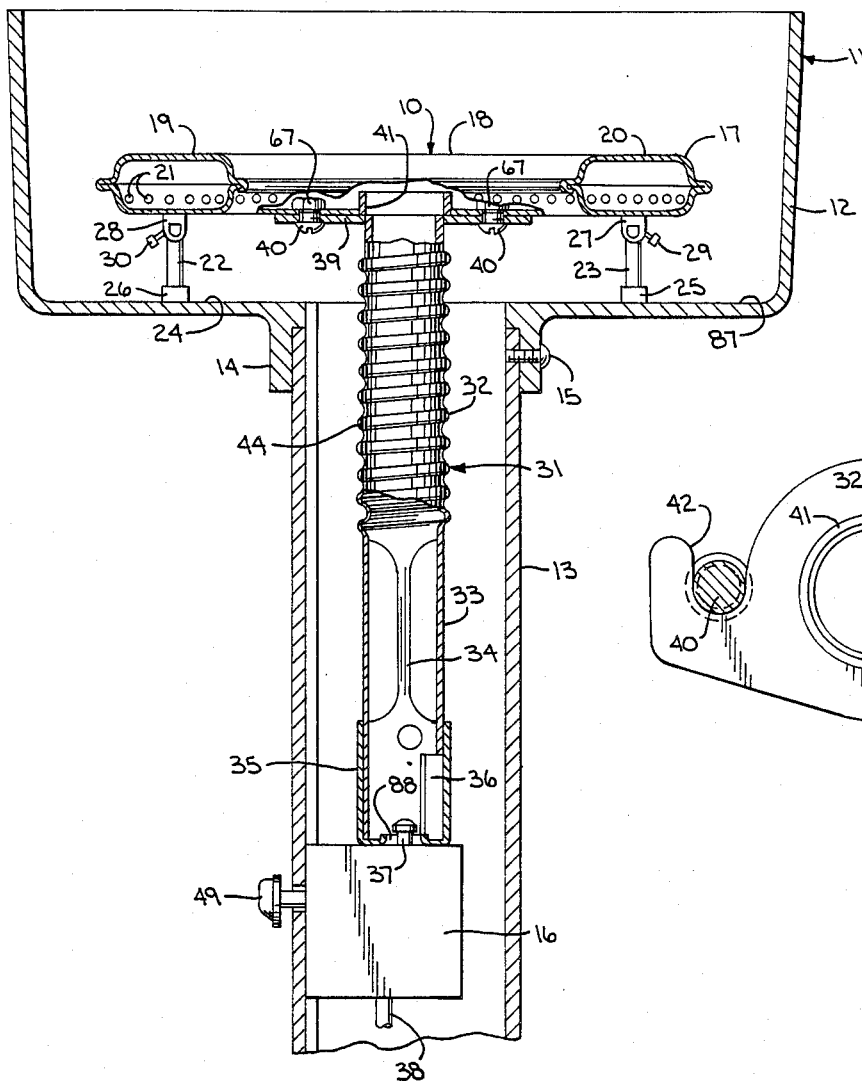
FIG. 1 is a view in partial vertical section of a grill unit showing the adjustable venturi tube and burner element of this invention.

Proceeding to a detailed description of the present invention, a gas burner element generally 10 is shown specifically in FIG. 1 and is utilized in conjunction with the gas barbecue grill unit generally 11. The grill unit 11 has the usual base member 12 and will include the usual grate and cover (not shown) placed over the burner 10. The base 12 is supported and secured by the normal post 13 by means of a flange 14 and a screw 15. A post 13 will carry a gas control 16 and have an air vent (not shown). It will be noted that the burner element 10 is formed from a hollow body member 17 having a central portion 18 and four arm portions, two of which are shown at 19 and 20, resulting in an H-shaped configuration with apertures 21. Extending from each arm portion is a leg member such as 22 and 23, which is positioned near the end of the arm portions and in the direction of the floor 24. The leg members 22 and 23 are pivotally and extendably secured to the bottom of the arm portions 19 and 20 and will contact the foot pads such as 25 and 26 on floor 24 of the base member 12. The leg members 22 and 23 are slidably positioned in the tubular portions 27 and 28 and fastened by the screws 29 and 30. They are described in more detail in U.S. Pat. No. 4,267,816 by the same inventor. The burner element 10 communicates with the novel venturi tube assembly generally 31 including a gas intake portion 32 and a venturi tube or a tubular portion 33 with the usual finned section 34. A rotatable air regulator 35 is slidably disposed at one end of the tubular portion 33 having an adjustable lateral opening 36 the size of which is controlled by the regulator 35. The venturi tube assembly 31 is positioned on a control 16 by means of the air regulator 35 in the form of a rotatable collar. The usual slot and screw are disposed in the air regulator 35 for air adjustment. A gas supply orifice 37 fed by a gas supply line 38 is centered in an opening 88 provided by the tubular portion 33 and the air regulator 35. At the opposite end, the venturi assembly gas intake portion 32 is operatively connected to the burner element 10 by means of a flange 39 and the screws 40 and nuts 67 with the flange 39 extending from the intake portion 32.

Figure 2:
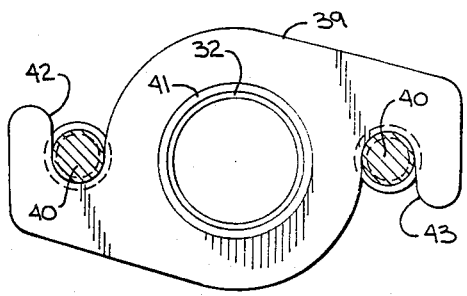
FIG. 2 is an enlarged top plan view depicting the mounting flange for attachment of the adjustable venturi tube shown in FIG. 1. with the burner element.

As best seen in FIG. 2 the flange 39 is generally Z-shaped in configuration and has the open ended slots 42 and 43 to receive the screws 40. An annular member 41 is centrally disposed in burner 10 to provide a gas flow passage from the intake portion 32. It will be noted that the intake portion 32 is formed from a flexibile section 44 which is integrally formed with the venturi portion 33. The flexible section 44 is preferably formed from stainless steel with corrugations in a manner to afford easy axial compression or expansion as will be later described.

Figure 3:
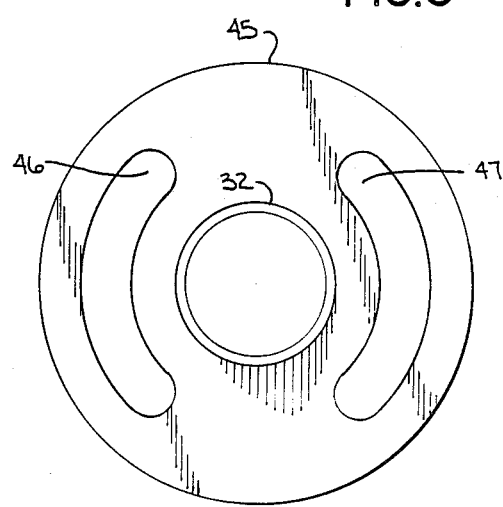
FIG. 3 is a view similar to FIG. 2 illustrating an alternative configuration of a mounting flange.

Referring to FIG. 3, it will be seen that a circular flange 45 has two arcuate slots 46 and 47 which will receive the screws 40 which in turn are fastened to the burner element 10 with nuts 67. The flange 45 is connected to the gas intake portion 32 of the venturi assembly 31 by means of a flexible metal tube or a bellows portion 44.

Figure 4:
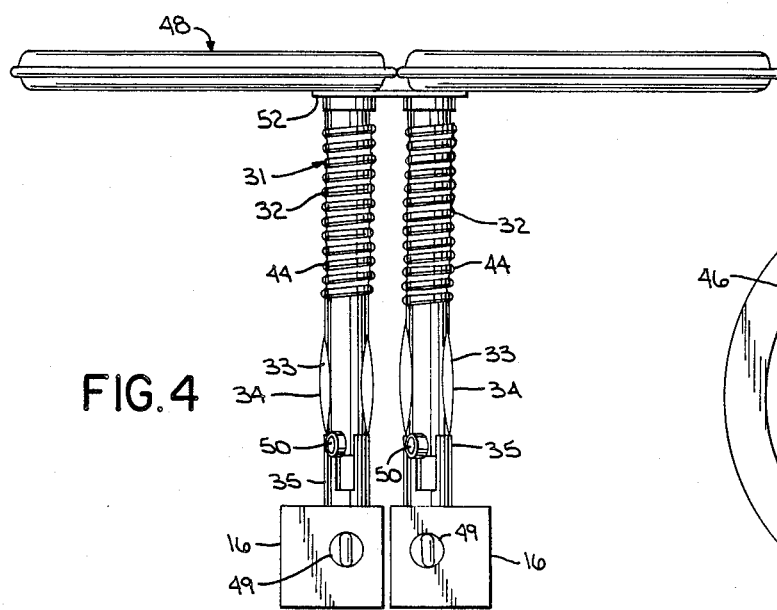
FIG. 4 is a view in side elevation showing two adjustable venturi tubes of this invention attached to a double burner unit.

Referring to FIG. 4, an alternative embodiment is depicted wherein two venturi assemblies generally 31 are employed in conjunction with the dual burner element generally 48. These burner elements are standard and are generally H-shaped in configuration as indicated in FIG. 5. The venturi assemblies 31 are joined in fluid communication with burner element 48 by means of a mounting bracket 52. As the venturi assemblies 31 shown in FIG. 4 are the same as illustrated in FIG. 1, the same numbers designate the same parts including the gas controls 16 and control knobs 49. In this particular embodiment the adjustment screw 50 is shown for the rotatable regulators 35 which is standard and will ride in the usual adjustment slot (not shown).

Another alternative embodiment of the present invention is shown in FIGS. 5 and 6. In this embodiment the novel venturi assemblies generally 51 are especially adapted to be employed for both horizontal and vertical adjustment with the dual burner unit generally 48. The grill unit generally 53 has a ase member 54 and will include the usual grate (not shown) over the dual burner element 48 and will include a cover 55. The base 54 is supported and secured to a post 56 which in turn is secured to a foot base 57. A gas supply tank 58 is seated on the base 57 and has a valve 59 which is interconnected to a gas control 61 in the housing 62 equipped with the control knobs 63. The gas feed lines 64 and 65 extend from the gas control 61 as well as through a support bracket 66 where each will be positioned in fluid communication with the dual adjustable venturi or the gas intake assemblies generally 51. Each venturi tube assembly in turn is connected with the H-shaped dual burner element 48.

Referring to FIG. 6, one of the venturi tube assemblies 51 as shown in FIG. 5 is depicted in conjunction with burner 48 which will have the arm portions 19 and 20 as well as a central portion 18. The venturi assembly 51 includes a first gas intake venturi member 69 which is similar to the venturi assembly 31. This is also true with respect to the venturi assemblies generally 71 and 72 shown in FIGS. 7 and 8 with the venturi members 73 and 74 respectively. Accordingly, similar parts are referred to with similar numbers. The difference between the gas intake portion 32 in venturi assembly 31 and the gas intake portion 89 in venturi member 69 of venturi assembly 51 is in an extension 70 which extends into supply tube member 75. A compression nut 76 provides a leak proof connection between the supply tube 75 and the extension 70 in the manner described in the previously referred to U.S. Pat. No. 4,478,205. At the opposite end of the supply tube 75, a gas intake tubular member 77 with an extension 78 telescopes into it and is secured therein by a second compression nut 79 which is similar to compression nut 76 and affords the same type of connection. Although not shown in connection with the compression nut 76, the supply tube 75 will include oppositely positioned slots, one of which is indicated at 80 as well as adjacent and circumferentially positioned threads (not shown) in the manner described in the previously referred to patent application. The gas intake member 77 is secured to burner 48 by means of the previously referred to flange 39 with the screws 40 and nuts 67.

The venturi assembly generally 71 differs from the assembly 51 in that in place of supply tube 75 in the form of a rigid elbow, a gas supply tube 91 with a flexible elbow portion 81 is employed. It is connected to burner 48 at one end by the flange 39 and the screws 40 and nuts 67. At the opposite end it receives a venturi member 73 which has an extension 82 extending from gas intake portion 90 for fitting inside a larger diameter rigid portion 83 which will have the previously described slot 80 and the thread arrangement for receiving the compression nut 79. A flange 84 is disposed between the rigid and flexible portions 83 and 81 respectively of gas supply tube portion 91.

Referring to FIG. 8, a venturi assembly 72 includes features of both the venturi assemblies 51 and 71. It will be seen that it has a gas supply tube member 92 with flexible elbow section 85 similar to the venturi assembly 71 as well as a rigid tubular portion 83 for receiving an extension 82 of the gas intake portion 93 of venturi member 74. The compression nut 79 makss the attachment in the manner previously described. Rather than having the flexible elbow section 85 secured directly to the burner 48, the venturi assembly 72 employs a slidable connection with the gas intake member 77. A rigid portion 86 of supply tube 92 with flange 84 provides a telescoping interfitment with the extension 78 of intake member 77 and with the compression nut 79 allowing the attachment as previously described.

FIGS. 9-12 illustrate a further modification of an adjustable venturi assembly generally 100. It has two tubular portions 101 and 102 with flexible portions 44 preferably extending substantially the entire length of the tubular portions. This portion of the venturi assembly resembles venturi assembly 31. However, it will be seen that this assembly also has a venturi tube member 106 which is slidable within tubular portion 101. Unlike venturi members 69, 73 or 74, it will not have a flexible section 44 or the finned section 34. However, it will have the previously described rotatable air regulator 35 and lateral opening 36 with the regulator 35 controlled by the screw 50 sliding in slot 105 of the regulator in the usual manner. A flange 103 is provided to house a seal 104 for contact with the smooth walled venturi tube 106. However, it has been found that the flange 103 and the seal 104 are optional and can be eliminated. As indicated in FIGS. 10 and 11, a similar smooth walled and slidable venturi tube 107 will telescope within tubular portion 102. A gas nozzle connection is made through the opening 88 in the rotatable regulator 35.

An important aspect of this invention is the fact that multiple adjustments between a gas burner such as 10 and a gas supply orifice 37 or the gas feed lines 64 and 65 which will have the usual nozzle portions at the end thereof can be effected. When it is desired to assemble the venturi assembly 31, the flange 39 will be fastened to burner 10 by employing the screws 40 and nuts 67. The venturi portion 33 will be placed over the gas supply nozzle 37 and legs such as 22 and 23 suitably adjusted to sit on the foot pads 25 and 26. It will be appreciated that any adjustment in height between nozzle 37 and the burner 10 as resting on the foot pads 25 and 26 is easily compensated for as flexible section 44 is easily compressed or expanded in an axial manner.

When it is desired to assemble the dual adjustable venturi assemblies 51 with the burner element 48, the flange 39 will be secured to the burner 48 by means of the screws 40 and nuts 67 as described in conjunction with venturi assembly 31. Similarly, leg members 22 and 23 will be placed on the foot pads 25 and 26 or similar surfaces on the floor 87 of the base member 54 of the gas grill unit 53. The next alignment which will be made will be to place the nozzles of the gas feed lines 64 and 65 in an opening such as 88 of the rotatable air regulator 35 as shown in FIG. 1. Suitable adjustment will be made between the burner 48 and the venturi member 69 by means of the flexible movement of flexible section 44, and the telescoping of extension 78 of gas intake member 77 into the supply tube 75 as well as the telescoping of the extension 70 into the supply tube 75. It should also be pointed out that the flexing of the flexible section 44 and the telescoping of the extension 70 into the supply tube 75 affords longitudinal or horizontal distance adjustment, and the telescoping of the extension 78 into the supply tube 75 provides vertical adjustment. Radial adjustment for the attachment by screws 40 and nuts 67 is also afforded with the burner 48 by means of the flange 39 with the open slots 42 and 43 or the arcuate slots 46 and 47 of the flange 45 attached to the gas intake tubular member 77 which can be suitably rotated in the supply tube 75 prior to fastening with the compression nut 79.

The venturi assembly 71 can be adjusted in the dual manner with respect to burner 48 as described for the venturi assembly 51. The difference in the adjustment is the fact that the flexible elbow section 81 will provide both horizontal and vertical adjustment as well as rotation for the flange 79 in place of only vertical adjustment and rotation as afforded by the telescoping of the gas intake member 77 into the supply tube 75. Horizontal adjustment is also afforded by flexible section 44. Venturi assembly 72 affords the vertical or rotational adjustment through the tubular gas intake member 77 telescoping into rigid portion 86 similar to venturi assembly 51. It also offers both vertical and horizontal adjustment by means of the flexible elbow portion 85 and the flexible section 44 with the telescoping of extension 82 into rigid portion 83 affording still additional horizontal adjustment. Venturi assembly 100 also offers both vertical and horizontal adjustment in either barbecue grill units 11 or 53. When utilized in grill unit 11 the flexible section 44 will allow movement in a horizontal manner to adjust for any vertical alignment variations. The slidable venturi tubes 106 and 107 will offer the additional adjustment of vertical height adjustment. When the venturi assembly 100 is to be employed in conjunction with barbecue grill unit 53, the flexible section 44 will act as an elbow such as indicated in venturi assemblies 71 and 72. This will provide both horizontal and vertical adjustment between burners 48 and gas nozzle support bracket 66. Additional horizontal adjustment will be afforded by the slidable venturi tubes 106 and 107.

All of the venturi assemblies of this invention are preferably employed as single or dual units. If desired three or more of the venturi assemblies could be interconnected by suitable bracket members and connected to a corresponding number of burners.

Gas-fired grill units 11 and 53 are made of cast aluminum whereas the burner elements 10 and 48 are manufactured from stainless steel. Venturi tube fin portions and rigid supply tube portions 75 and 77 as well as rigid portions 83 and 86 are also made from steel and are usually chromeplated. Flexible sections 44 as well as 81 and 85 are fabricated from stainless steel. However, other heat resistant metals such as aluminum, copper or plastic materials could be employed. In the instance of flexible sections 44 in venturi assembly 31 the expansion or contraction in an axial manner of the flexible section is quite critical as a sole height adjustment. Accordingly, it has been found that the flexible section 44 is preferably fabricated from stainless steel with a wall thickness of between 0.006 to 0.008 inch. The inside diameter of the flexible section 44 is one inch whereas the outside diameter is 1½ inches. It should be pointed out that an outside diameter to inside diameter ratio of 50% works well and can be as low as 38% . In the present instance the flexible section 44 was fabricated from RF 44 steel having 76 cores per foot and was annealed. The venturi assembly 31 preferably has five inches of flexible section 44 and four inches of neck or venturi portion 33. The flexible section 44 can be fabricated in one piece with the venturi portion 33 or can be fabricated separately and secured such as by pressure fit, welding, gluing, soldering or crimping. While the screws 40 and nuts 67 have been indicated as a preferred means for securing flanges 39 and 45 to burners 10 and 48, screws alone could be used. While burners 10 and 48 are shown as H or U-shaped in configuration, it will be appreciated that the adjustable venturi tube assemblies of this invention could be utilized with any configuration of burner, as indicated by burner 48, and can be of a straight tube, star-shaped or figure eight variety. Also, while the gas supply tubes and orifices have been indicated for connection through an air regulator or shutter 35, obviously various types of connections can be made with the gas supply tube and the venturi tube assemblies such as natural gas, propane and butane and still utilize the adjustable features of this invention. The compression nuts such as 76 and 79 have been employed for adjustably securing the venturi members 69, 73 and 74 to the respective supply tubes 75, 91 and 92 together as well as to the gas intake members 77. If desired, although not as efficient, these compression nuts could be eliminated with extensions 70, 78 and 82 positioned loosely in the respective supply tubes.

It will thus be seen that in the present invention there is now provided an adjustable venturi assembly which is fabricated to fit numerous types of barbecue grills irrespective of the vertical or horizontal space differences between the burner element and the gas supply means. Not only is horizontal or vertical adjustment afforded but also radial adjustment as well. The various adjustments of the venturi tube and gas supply tubes are easily effected by means of easily compressible or expandable flexible tube portions. These adjustments can be employed alone or in conjunction with adjustable leg members to afford adjustment of the burner and the venturi tubular member. The adjustable venturi assemblies are advantageously employed in conjunction with barbecue grill units where only vertical adjustment is required between the burner and its source of gas or where the gas supply is positioned at right angles to the burner element. Additionally, the venturi tube assemblies provide for sturdy placement of the burner in the grill units.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A universally adjustable gas intake tube assembly for use as a replaceable connection between a fixed gas supply means and a burner element in a gas barbecue grill unit wherein said burner element and a gas control unit having a gas supply orifice are positioned in a stationary manner in said barbecue grill unit where the spacing therebetween is variable comprising:
    a first tubular member defining at least one aperture;
    an air regulator member received by said first tubular member at one end thereof to control the flow of air entering through said aperture;
    an opening defined by said first tubular member at one end for receiving a gas supply means;
    a second tubular member, said second tubular member connected to said first tubular member at the other end, one of said tubular members having a flexible section and a compartment positioned adjacent one of the open ends of said first or second tubular members with a seal member retained in said compartment, said first and second tubular members defining a freely telescoping and slidable sealing relationship with respect to each other and without compression of said seal member by any external forces with said air regulator member being movable with said first tubular member; and
    means securing said second tubular member to said gas burner element which is supported in a generally horizontal manner with respect to a floor of said barbecue grill unit, said flexible section being positioned between said air regulator member and said burner element, said securing means being adapted to permit replacement of said gas intake tube assembly.

2. The universally adjustable gas intake tube assembly as defined in claim 1 wherein said telescoping relationship is defined by said first tubular member telescoping with said second tubular member.

3. The universally adjustable gas intake tube assembly as defined in claim 2 wherein said second tubular member is defined by a right-angled flexible section.

4. The universally adjustable gas intake tube assembly as defined in claim 3 further including a third separate tubular member telescoping with and adjustably secured to said second tubular member opposite said first tubular member and said means for connection with said gas burner element is made with said third tubular member rather than said second tubular member.

5. The universally adjustable gas intake tube assembly as defined in claim 1 wherein said second tubular member is rigid and defines a right angled section and said telescoping relationship is defined by said first tubular member comprising a separate tubular member and placed in a telescoping manner with said second tubular member.

6. The universally adjustable gas intake assembly as defined in claim 5 further including a third separate tubular member telescoping with and adjustably secured to said second tubular member opposite said first tubular member and said means for connection with said gas burner element is made with said third tubular member rather than said second tubular member.

7. The universally adjustable gas intake tube assembly as defined in claim 1 wherein said gas burner element is connected to said second tubular member.

8. The universally adjustable gas intake tube assembly as defined in claim 1 wherein both said first and second tubular members include flexible sections.

9. The universally adjustable gas intake tube assembly as defined in claim 1 wherein said flexible section is operatively associated with said second tubular member and provides axial compression or expansion.

10. The universally adjustable gas intake assembly as defined in claim 1 wherein said universally adjustable gas intake tube assembly includes a second universally adjustable gas intake tube assembly with both said tube assemblies housed in a common gas grill unit.

11. A universally adjustable gas intake tube assembly for use as a replaceable connection between a fixed gas supply means and a burner element in a gas barbecue grill unit wherein said burner element and a gas control unit having a gas supply orifice are positioned in a stationary manner in said barbecue grill unit where the spacing therebetween is variable comprising:
  a first tubular member defining at least one aperture at one end for connection with a gas supply means;
  air regulation means operatively connected to said first tubular member for use with said gas supply means;
  a second tubular member having a flexible section and a compartment positioned adjacent an open end of said second tubular member with a seal member retained in said compartment, said second tubular member connected to said first tubular member at the other end in a slidable manner and without compression of said seal member by any external forces, said first tubular member freely telescoping within said second tubular member with said air regulator member being movable therewith; and
  means securing said second tubular member to said gas burner element which is supported in a generally horizontal manner with respect to a floor of said barbecue grill unit, said flexible section being positioned between said air regulation means and said burner element, said securing means being adapted to permit replacement of said gas intake tube assembly.

12. The adjustable gas intake tube assembly as defined in claim 11 wherein said flexible section of said second tubular member extends substantially the entire length of said second tubular member.

13. The adjustable gas intake tube assembly as defined in claim 11 wherein said adjustable gas intake tube assembly includes a second adjustable gas intake tube assembly with both said tube assemblies housed in a common gas grill unit.

14. The adjustable gas intake tube assembly as defined in claim 11 wherein said first tubular member has a smooth wall.

15. A flexible and length adjustable gas/air feeder venturi tube assembly for use as a replaceable connection between a gas burner element and gas controls on diverse types of gas fired barbecue grills, said assembly comprising:
  a flexible conduit section having a substantially flat mounting flange secured to one end thereof;
  a straight cylindrical substantially rigid venturi tube section telescopically and slidably engaged with the flexible conduit section, said flexible conduit section having a reduced diameter cylindrical sleeve extension on one end thereof telescopically and slidably receiving said venturi tube section therein;
  a compartment positioned in said reduced diameter cylindrical sleeve extension with a seal member retained in said compartment to contact said straight cylindrical venturi tube section in a slidable and sealing relationship and without compression of said seal member by any external forces; and
  air inlet and air regulation means on said venturi tube section near the end thereof away from said flexible conduit section and freely movable therewith, said mounting flange being adapted to permit replacement of said adjustable gas/air feeder assembly.

* * * * *

UNITED STATES PATENT AND TRADEMARK OFFICE
CERTIFICATE OF CORRECTION

PATENT NO. : 4,773,384

DATED : September 27, 1988

INVENTOR(S) : Koziol

It is certified that error appears in the above-identified patent and that said Letters Patent is hereby corrected as shown below:

| | |
|---|---|
| Column 4, line 33 | "ase" should read --base-- |
| Column 5, line 28 | "makss" should read --makes-- |
| Column 8, line 62 (Claim 6) | after "intake" --tube-- should appear |
| Column 9, line 11 (Claim 10) | after "intake" --tube-- should appear |

Signed and Sealed this

Twenty-fourth Day of October, 1989

Attest:

DONALD J. QUIGG

*Attesting Officer*   *Commissioner of Patents and Trademarks*